United States Patent [19]

Bruns et al.

[11] Patent Number: 5,098,050
[45] Date of Patent: Mar. 24, 1992

[54] PORTABLE DECOY STAND

[76] Inventors: Gary L. Bruns, HC 68, Box 46, Chappell, Nebr. 69129; William N. Hendrix, Julesburg, Colo. 80737; Glenn D. Toyne, 11759 Hwy. 59, Sedgwick, Colo. 80749

[21] Appl. No.: 745,947

[22] Filed: Aug. 16, 1991

Related U.S. Application Data

[63] Continuation of Ser. No. 517,231, May 1, 1990.

[51] Int. Cl.⁵ ............................................. A01M 31/06
[52] U.S. Cl. .................................. 248/176; 248/163.1; 43/3
[58] Field of Search ...................... 248/163.1, 521, 519, 248/520, 528, 167; 43/3, 2

[56] References Cited

U.S. PATENT DOCUMENTS

| | | | |
|---|---|---|---|
| 2,698,726 | 1/1955 | Howe | 248/46 |
| 2,787,074 | 4/1957 | Miller | 43/3 |
| 2,964,094 | 12/1960 | Gariepy | 248/600 |
| 3,435,550 | 4/1969 | Crlson | 43/3 |
| 3,736,688 | 6/1973 | Caccamo | 43/3 |
| 3,768,192 | 10/1973 | Caccamo | 43/3 |
| 4,893,428 | 1/1990 | Gagnon | 43/3 |
| 4,965,953 | 10/1990 | McKinney | 43/3 |

FOREIGN PATENT DOCUMENTS 560498  7/1958  Canada ............................ 248/528

*Primary Examiner*—Reinaldo P. Machado
*Attorney, Agent, or Firm*—Dean P. Edmundson

[57] ABSTRACT

A portable decoy stand is described which is especially useful for supporting a bird decoy. The stand includes a base and attachment mechanism which supports the decoy and allows it to bob or tilt relative to a vertical axis. Air movement past the decoy causes it to move, giving the impression that the decoy is alive. The decoy is very effective in attracting live birds.

16 Claims, 3 Drawing Sheets

PORTABLE DECOY STAND

This application is a continuation of Ser. No. 07/517,231 filed 05/01/90.

FIELD OF THE INVENTION

This invention relates to techniques for using decoys. More particularly, this invention relates to use of decoys for hunting. Even more particularly, this invention relates to techniques for supporting bird decoys while hunting.

BACKGROUND OF THE INVENTION

The use of decoys to attract game birds while hunting has been commonplace for many, many years. Various types of decoys have been used, both on land and on water. Decoys used on land are typically rested directly on the ground and remain in a stationary position. Sometimes such decoys are held in place by a stake driven into the ground to prevent them from being tipped over or moved by the wind.

Unfortunately, it has been found that decoys which are stationary are not as effective as desired for attracting live birds and enticing such birds to approach the decoys.

There has not heretofore been provided a decoy stand which is effective in supporting a bird decoy on the ground in a manner which enables the decoy to exhibit natural or desirable movement. Although there has been proposed an air sock decoy which can be pivotably supported on a stake, such type of decoy is not realistic in appearance or movement and accordingly has not been very successful.

SUMMARY OF THE INVENTION

In accordance with the present invention there is provided a portable decoy stand which is especially useful for supporting a bird decoy (e.g., a goose or duck decoy) on the ground in a manner such that the decoy appears life-like and is able to move slightly in response to moving air currents.

In one embodiment the invention comprises a base means and attachment means for attaching the decoy to the base. The base means enables the decoy to bob or wobble slightly relative to the base. This bobbing action or movement makes the decoy appear to be a live bird. This is very desirable and it makes the decoy much more effective than stationary decoys in terms of the ability to attract live birds.

The portable decoy stand of this invention is intended primarily for use on land to support game bird decoys (e.g., goose, duck, turkey, quail, pigeons, doves, etc.). The base can be secured to the ground, if desired, by means of stakes, pins, nails, anchors, etc.

The portable stand can also be collapsed for easy and convenient transport and storage. This makes it easier and more convenient to use the decoy stand in the field.

Other advantages of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF THE INVENTION

Figure 1:
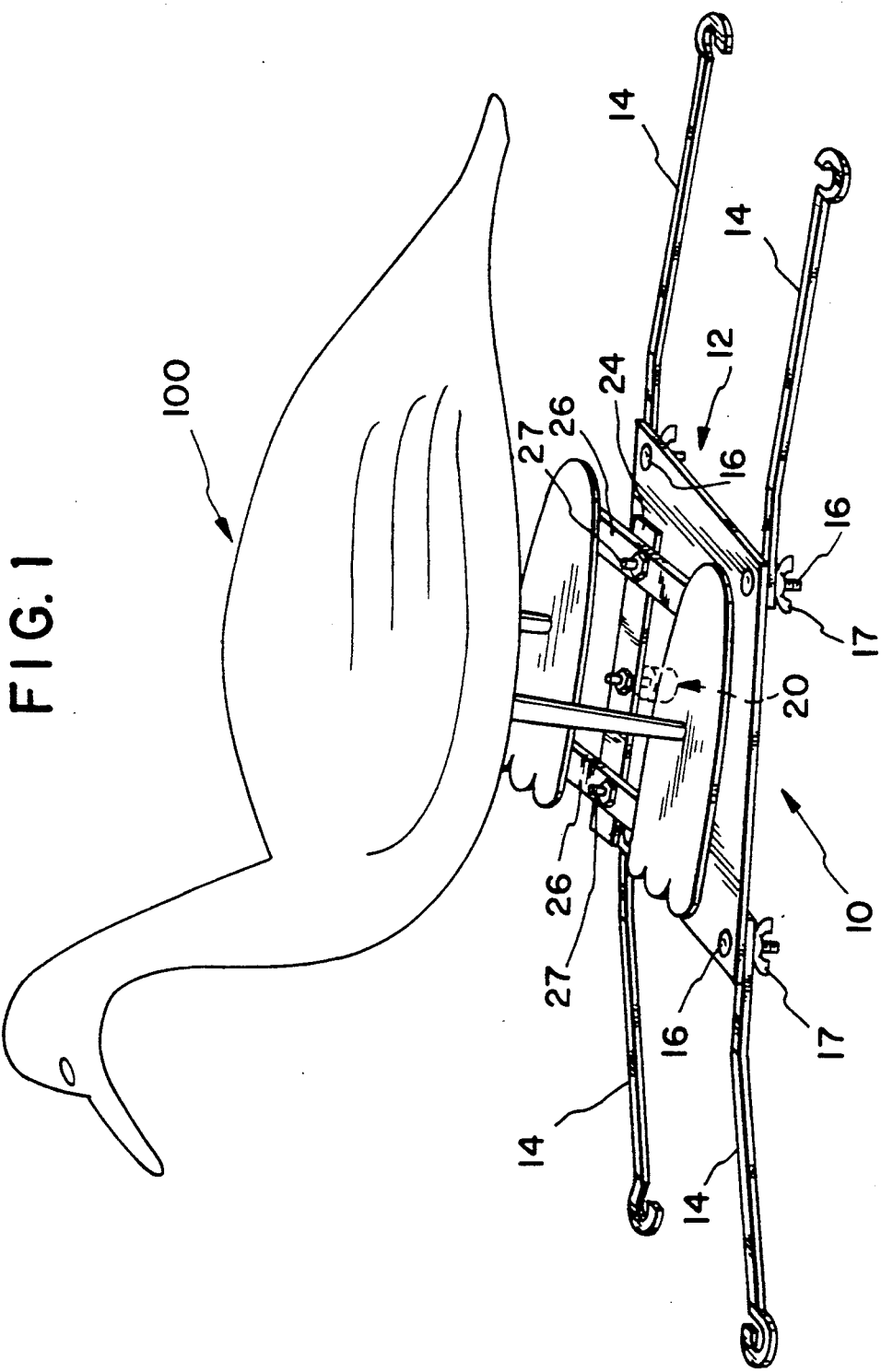
FIG. 1 is a perspective view illustrating the use of a decoy stand of the invention to support a bird decoy.
Figure 2:
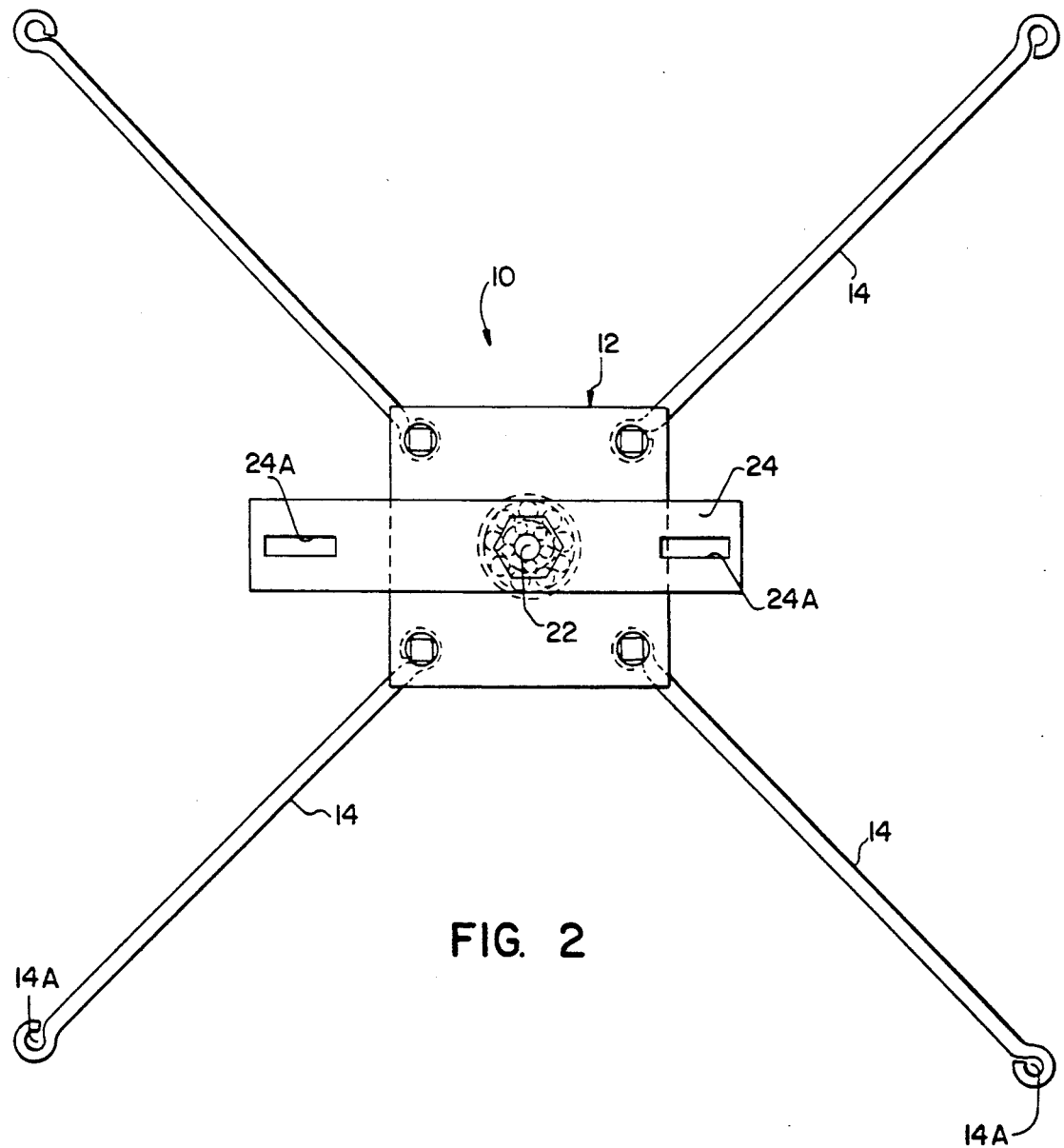
FIG. 2 is a top view of the decoy stand of FIG. 1.

In the drawings there is illustrated a portable decoy stand 10 of the invention for supporting a game bird decoy 100 on the ground in the field The decoy stand includes a base 12 to which a plurality of leg members 14 have been attached.

One end of each leg may be attached to the base by means of a bolt 16 having a wing nut 17 thereon. This enables the bolts to be tightened or loosened without the need for tools. Thus, the decoy stand can be carried to the field in a collapsed position and then the legs can be pivoted outwardly to a desired position where the bolts can be readily tightened to hold the legs in that desired position.

Figure 3:
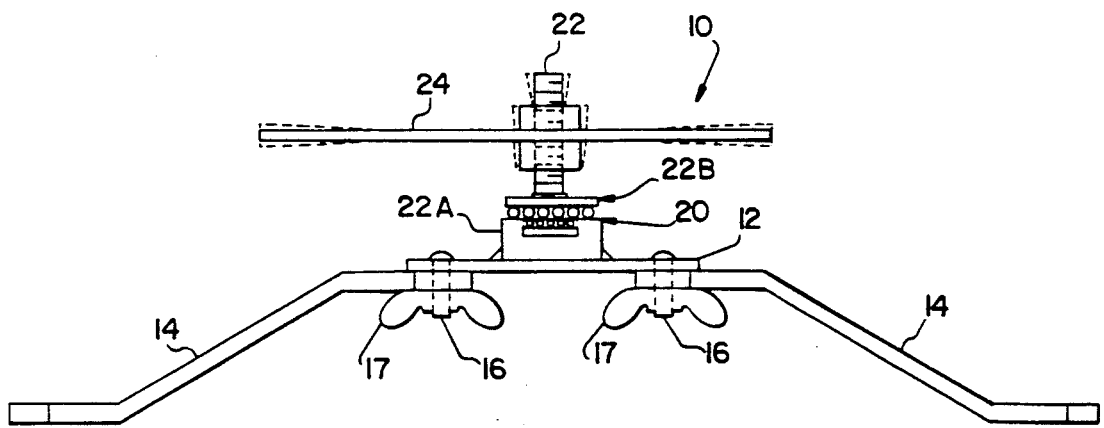
FIG. 3 is a side elevational view of the decoy stand of FIG. 1.

Attached to base 12 there is an upstanding support member 20 including post member 22 and elongated mounting bar 24. The lower end of post member 22 is rotatably mounted to housing 22A by means of a castor 22B (e.g., a conventional mop bucket castor). This type of castor has sufficient play in it to allow post 22 to tilt slightly in every direction without binding. For example, post 22 should be able to tilt at least 3° from vertical in every direction and it may tilt as much as 5° in every direction. This tilting or bobbing feature is illustrated in FIG. 3 where the dotted lines illustrate permissible tilting movement of the post 22 and the mounting bar 24.

The bird decoy 100 is attached or fastened to mounting bar 24 by means of bars 26 and bolts 27. Bar 24 includes elongated apertures 24A so that the position of the decoy on the stand may be adjusted forwardly or rearwardly, as desired. Other types of decoys may require different types or styles of mounting brackets in order to enable such decoys to be mounted or supported on post 22. The particular type or style of mounting brackets used is not critical for the purpose of this invention.

It is important, however, for the decoy to be mounted in such a manner that it is balanced or nearly balanced on post 22. This enables the decoy to tilt or bob easily with the slightest amount of air movement past the decoy. This tilting or bobbing action or movement simulates a live bird and makes the decoy much more effective in attracting live birds to the vicinity of the decoy.

The size and style of the base 12 may vary. It is shown in the drawings as a rectangular plate but it could be round, oval, square, triangular, etc. If desired, it could be disk-shaped and could include a concave bottom surface. It may be composed of metal, plastic, or composite materials. Preferably it is weather-proof.

The presence of legs 14 is preferred. These legs are preferably pivotably or detachably attached to the base 12 so that they can be pivoted to an inward position for transport and storage of the stand, or they may be removed entirely. The length of the leg members may vary, e.g., from about 8 inches to 16 inches. When leg members are used, there should be at least three of them (and preferably four). Although additional leg members could be used, if desired, they are not necessary.

The leg members preferably have appropriate bends in them which enable them to support the base 12 above the ground a few inches. If desired, the outer end of each leg member may include an eyelet 14A to enable a stake, spike, or pin to be driven therethrough into the ground to hold the stand steady against high winds, for example.

The leg members may be composed of metal, for example. They may be made of round, square or flat bar stock, if desired, and they may be bent slightly in the field, if necessary, to enable the stand to be firmly supported evenly on all legs regardless of the type of terrain in the field.

Figure 4:
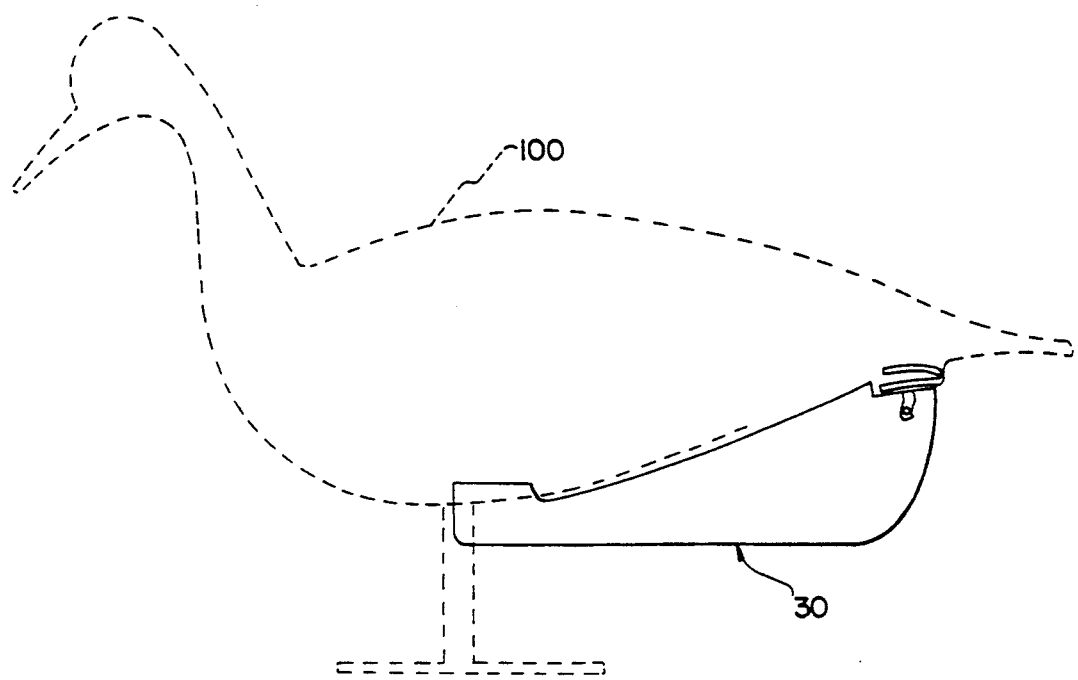
FIG. 4 is a side elevational view illustrating another embodiment of the present invention.

Another variation of the invention is illustrated in FIG. 4. In this embodiment a planar deflector 30 is shown attached to bird decoy 100. Each end of the deflector includes means for attaching the deflector to a bird decoy in a manner such that the deflector is in a vertical plane and will present a large surface against which air currents can act to cause the decoy to turn or move as it is supported on the stand.

The decoy stand of the invention can be made in any size desired for accommodating a bird decoy of any size or style. As described herein, the decoy stand is lightweight and portable to facilitate convenience of handling, carrying and storage thereof. Because of the ability of the post member to rock or tilt relative to a vertical axis, the decoy supported on the stand appears more life-like and is therefore more effective in attracting live birds.

The decoy stand of the invention is useful even in conditions of high wind. Whenever the decoy on the stand moves too much or too rapidly to simulate a live bird, it is possible to retard or slow the movement of the decoy by simply tilting the stand to one side. This can be done, for example, by bending one of the leg members so that the stand leans to one side. Another manner of slowing the action of the decoy is by adjusting the position of the decoy on the stand so that it is off-balance to some extent. Another manner of changing the balance of the decoy on the stand is by adding weights to the front or the rear of the decoy.

As described above, the preferred decoy stand of the invention includes a mounting post secured to the base by means of a castor mounting which allows the post to tilt at least 3° in every direction. It also allows the post to rotate freely. Other mounting systems for supporting the decoy may also be used so long as it enables the decoy to tilt or rock in a similar manner. For example, the mounting could include a tubular member having an open lower end and a closed upper end. The tubular member could be supported on an upright post of smaller diameter having a pointed or rounded upper end. This enables the tubular member to rock or tilt relative to the upright post.

Other variants are possible without departing from the scope of this invention. The type and size of decoy supported on the stand may vary, as desired. The decoy may also be changed, as desired.

What is claimed is:

1. Portable decoy stand for supporting a bird decoy, said stand comprising:
   (a) stationary base means; and
   (b) attachment means for attaching said decoy to said base means;
   wherein said attachment means enables said decoy to bob relative to said base means comprises a rotatable and swingable upright post which.

2. A decoy stand in accordance with claim 1, wherein said base means includes at least three leg members.

3. A decoy stand in accordance with claim 2, wherein said legs are pivotably attached to said base; and wherein said base comprises a flat plate.

4. A decoy stand in accordance with claim 1, wherein said upright post member which is connected to said base means by means of a caster which enables said post member to tilt and bob relative to a vertical axis.

5. A decoy stand in accordance with claim 4, wherein said post member is capable of tilting at least 3° relative to a vertical axis.

6. A decoy stand in accordance with claim 4, wherein said attachment means further comprises an elongated mounting bar secured to said post member.

7. A decoy stand in accordance with claim 1, wherein said base means comprises a disk.

8. A portable decoy stand for supporting a bird decoy, said stand comprising:
   (a) stationary base means;
   (b) a plurality of leg members secured to said base means; and
   (c) attachment means comprising a rotatable and swingable upright post carried by said base means for attaching said decoy to said base means;
   wherein said attachment means enables said decoy to bob relative to said base means.

9. A decoy stand in accordance with claim 8, wherein there are at least three said legs each having a first end pivotably attached to said base means.

10. A decoy stand in accordance with claim 8, wherein said base means comprises a planar plate member.

11. A decoy stand in accordance with claim 8, wherein said upright post member which is connected to said base means by means of a caster which enables said post member to tilt and bob relative to a vertical axis.

12. A decoy stand in accordance with claim 11, wherein said post member is capable of tilting at least 3° relative to a vertical axis.

13. A decoy stand in accordance with claim 11, wherein said attachment means further comprises an elongated mounting bar secured to said post member.

14. A decoy stand in accordance with claim 11, wherein said mounting bar includes elongated apertures.

15. A portable decoy stand for supporting a bird decoy, said stand comprising:
   (a) stationary base means;
   (b) at least three elongated leg members pivotably secured to said plate member; and
   (c) attachment means comprising a rotatable and swingable upright post carried by said plate member for attaching said decoy to said plate member;
   wherein said attachment means enables said decoy to bob relative to said base means.

16. A decoy stand in accordance with claim 15, wherein said base means comprises a planar plate member, wherein said upright post member which is connected to said base means by means of a caster which enables said post member to tilt and bob relative to a vertical axis; and wherein said post member is capable of tilting at least 3° relative to a vertical axis.

* * * * *